United States Patent
McKelvey et al.

(10) Patent No.: US 7,000,405 B2
(45) Date of Patent: Feb. 21, 2006

(54) GAS TURBINE APPARATUS AND A STARTING METHOD THEREOF

(75) Inventors: Terence McKelvey, Chiba (JP); Eishi Marui, Kanagawa (JP); Masahiro Miyamoto, Kanagawa (JP); Tadashi Kataoka, Chiba (JP); Tai Furuya, Kanagawa (JP)

(73) Assignee: Ebara Corporation, Tokyo (JP)

( * ) Notice: Subject to any disclaimer, the term of this patent is extended or adjusted under 35 U.S.C. 154(b) by 0 days.

(21) Appl. No.: 10/483,085

(22) PCT Filed: Jan. 9, 2003

(86) PCT No.: PCT/JP03/00109

§ 371 (c)(1),
(2), (4) Date: Jun. 30, 2004

(87) PCT Pub. No.: WO03/060303

PCT Pub. Date: Jul. 24, 2003

(65) Prior Publication Data
US 2004/0237538 A1  Dec. 2, 2004

(30) Foreign Application Priority Data
Jan. 9, 2002  (JP)  ............................ 2002-002836
May 17, 2002  (JP)  ............................ 2002-143724

(51) Int. Cl.
*F02C 7/26* (2006.01)
(52) U.S. Cl. .................. 60/786; 60/778; 60/39.281
(58) Field of Classification Search .................. 60/778, 60/786, 787, 788, 790, 805, 39.281
See application file for complete search history.

(56) References Cited

U.S. PATENT DOCUMENTS

| | | | | |
|---|---|---|---|---|
| 3,662,545 A | * | 5/1972 | Davis | 60/39.281 |
| 3,667,218 A | * | 6/1972 | Davis | 60/39.281 |
| 5,031,397 A | * | 7/1991 | Firey | 60/787 |
| 5,121,596 A | * | 6/1992 | Takehara et al. | 60/775 |
| 5,899,411 A | * | 5/1999 | Latos et al. | 244/53 A |
| 5,966,925 A | * | 10/1999 | Torikai et al. | 60/778 |
| 6,175,210 B1 | * | 1/2001 | Schwartz et al. | 318/801 |
| 6,810,677 B1 | * | 11/2004 | Dewis | 60/778 |
| 2003/0056522 A1 | * | 3/2003 | Hartzheim | 60/779 |
| 2004/0011053 A1 | * | 1/2004 | Murakami et al. | 60/773 |
| 2004/0055273 A1 | * | 3/2004 | Hirayama et al. | 60/39.281 |

FOREIGN PATENT DOCUMENTS

EP  0 874 144 A2  10/1998

(Continued)

*Primary Examiner*—William H. Rodriguez
(74) *Attorney, Agent, or Firm*—Oblon, Spivak, McClelland, Maier & Neustadt, P.C.

(57) ABSTRACT

A gas turbine starting method, comprising the steps of rotatively driving a turbine by a motor coupled to the turbine, while at the same time supplying a compressed air to a combustor by an air compressor operating in interlocking motion with the turbine, starting a fuel supply to the combustor when a revolution speed of the turbine has reached up to a predetermined value, and simultaneously starting an igniting operation on an air-fuel mixture in the combustor, wherein at least during the igniting operation to the air-fuel mixture in the combustor, a quantity of fuel supply per unit time to the combustor is increased while increasing the revolution speed of the turbine, to thereby ensuring the ignition of the air-fuel mixture under various conditions, and depressing the temperature rise of the gas turbine, which may otherwise occur immediately after the ignition.

8 Claims, 7 Drawing Sheets

| FOREIGN PATENT DOCUMENTS | | | | | |
|---|---|---|---|---|---|
| GB | 1330853 | 9/1973 | JP | 60-243328 | 12/1985 |
| JP | 57-051914 | 3/1982 | JP | 182247/1988 | 11/1988 |
| JP | 157545/1984 | 10/1984 | WO | WO 03/014551 A1 | 2/2003 |

* cited by examiner

GAS TURBINE APPARATUS AND A STARTING METHOD THEREOF

FIELD OF THE INVENTION

The present invention relates to a gas turbine apparatus and a starting method thereof, and in particular, to a starting method for starting a gas turbine apparatus by using a starting motor.

BACKGROUND OF THE INVENTION

In general, a gas turbine apparatus basically comprises a turbine mounted on a rotary shaft, a combustor for burning a mixture of fuel and air to generate a combustion gas, a fuel flow control valve for controlling a quantity of fuel supply to the combustor, an air compressor for supplying the combustor with compressed air, the air compressor operating in interlocking motion with the turbine, and so on. In thus constructed apparatus, the air-fuel mixture produced by means of the fuel flow control valve and the air compressor is burnt to generate a combustion gas of high temperature and high pressure, which is then supplied to the turbine to make it revolve at high speed.

In this type of gas turbine apparatus, when it is to be started, such a method has been employed in which the turbine is driven by a motor for starting to actuate the gas turbine apparatus. That is, first of all, the turbine is rotatively driven by the motor while at the same time the air compressor is driven by the motor via the rotary shaft to start a supply of the compressed air to the combustor. After that, the fuel flow control valve is opened to supply the combustor with a fuel to produce a mixture of compressed air and the fuel therein. Subsequently, an igniting operation for the air-fuel mixture is started in the combustor, and then the air-fuel mixture is burned to generate the combustion gas, which is supplied to the turbine thereby making the turbine revolve at high speed.

In this regard, one of the requirements for igniting the air-fuel mixture is an appropriate mass ratio (or weight ratio) of air and fuel in the mixture, or an air fuel ratio (sometimes abbreviated to A/F). The air fuel ratio is the mass ratio between the air and the fuel, or a mixture ratio, provided for the combustion, which may be obtained as a flow rate of the air per unit time divided by a flow rate of the fuel per unit time. As described above, since the air is compressed by the compressor and then fed to the combustor, and this compressor has been driven in interlocking motion with the turbine, the flow rate of the air can be calculated based on a revolution speed of the turbine. On the other hand, the flow rate of the fuel can be calculated based on an opening of the fuel flow control valve. Accordingly, the air fuel ratio can be determined from the revolution speed of the turbine and the opening of the fuel flow control valve.

Figure 5:
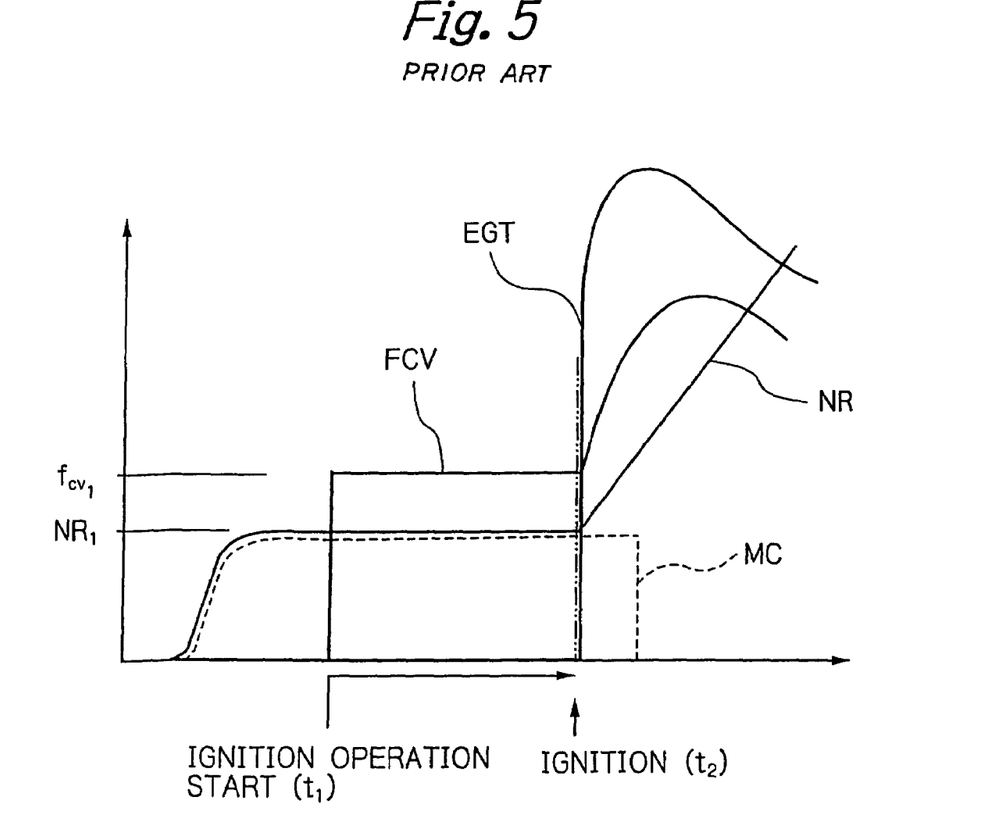
FIG. 5 is a diagram of a revolution speed of a turbine, an opening of a fuel flow control valve, and a temperature of an exhaust gas of a conventional gas turbine apparatus during an igniting operation thereof, each illustrated as a function of an elapsed time.

FIG. 5 is a schematic diagram of the revolution speed of the turbine, the opening of the fuel flow control valve and a temperature of an exhaust gas of the conventional turbine apparatus, each illustrated as a function of an elapsed time during a starting operation thereof. In FIG. 5, NR(Number of Revolution) represents a revolution speed of the turbine, FCV(Fuel Control Valve) represents an opening of the fuel flow control valve, EGT(Exhaust Gas Temperature) represents a temperature of the exhaust gas, and MC(Motor Current) represents a quantity of current supply per unit time to the motor, respectively.

As can be seen from FIG. 5, firstly the turbine is rotatively driven by the motor (see dotted line MC of FIG. 5), and after the revolution speed of the turbine reaches up to the revolution speed $NR_1$ required for ignition, the motor is controlled to maintain said revolution speed $NR_1$. Then, the fuel supply to the combustor is begun to produce the air-fuel mixture and simultaneously the igniting operation is started ($t_1$). At this time, the quantity of fuel supply per unit time (the opening of the fuel flow control valve) is maintained, as shown in FIG. 5, to a predetermined level of fuel supply quantity ($fcv_1$) suitable for the ignition.

Then, the air-fuel mixture is ignited to generate the combustion gas ($t_2$), which is fed to the turbine so as to provide the power thereto, and thereby the revolution speed of the turbine is increased. Subsequently, the rotatively driving operation of the motor is stopped. When the rotatively driving operation by the combustion gas begins, a speed up of the turbine is put under the control by adjusting the supply quantity of the combustion gas to the turbine. That is, a speed up control is applied, in which the opening of the fuel flow control valve is operated to increase the revolution speed of the turbine so that an acceleration of revolution of the turbine may reach up to a predetermined target acceleration level.

As described above, during the igniting operation (time period from $t_1$ to $t_2$), the air fuel ratio is set to be a certain value suitable for ignition, and accordingly, as shown in FIG. 5, the revolution speed of the turbine (the flow rate of the compressed air) and the opening of the fuel flow control valve (the fuel supply quantity) are maintained to be constant respectively. Thus, the igniting operation is performed under the specific air fuel ratio suitable for ignition so that the air-fuel mixture may be ignited soon.

However, the air fuel ratio suitable for ignition varies depending on the specific actual conditions in respective ignition operations. For example, when the temperature of surrounding environment is low, it is rather difficult to accomplish a smooth ignition, while an ignition for restarting under a high temperature condition of the gas turbine main body shortly after the stop of operation may be performed easily. That is, the ignition may not always be successfully performed under the same air fuel ratio on every occasion, and sometimes the air-fuel mixture cannot be ignited resulting in a failure of the starting operation.

Figure 6:
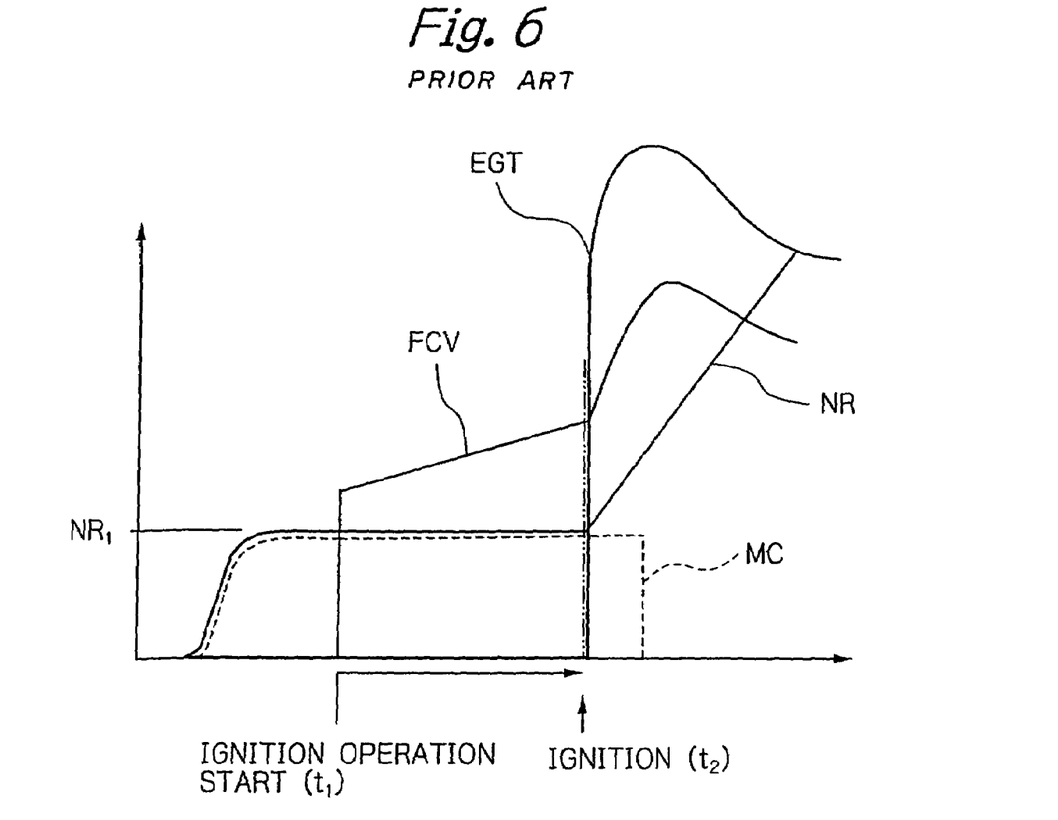
FIG. 6 is a diagram of a revolution speed of a turbine, an opening of a fuel flow control valve, and a temperature of an exhaust gas of another conventional gas turbine apparatus during an igniting operation thereof, each illustrated as a function of an elapsed time.

In order to deal with the problem described above, one approach has been conventionally attempted, in which, as shown in FIG. 6, while keeping the revolution speed of the turbine to be constant, the opening of the fuel flow control valve is increased gradually to vary the air fuel ratio so as to follow the change in the suitable ignition condition. In this case, however, such a problem has arisen as follows. That is, immediately after the ignition ($t_2$), as described above, the control of the turbine is switched from the phase of the driving by the motor to another phase of the speed up control by the supply of the combustion gas. At that time, since the revolution speed of the turbine immediately after the ignition (t2) is kept constant and the acceleration thereof is equal to zero, the acceleration of revolution of the turbine right after the switching of the control phase has a substantial deviation from the target acceleration thereof.

This makes the fuel flow control valve open to excessive degree right after the shifting to the speed up control phase due to a control action needed for minimizing this deviation. Therefore, the fuel is excessively supplied to the combustor through the fuel flow control valve, which cause a problem that immediately after the ignition, the temperature of the gas turbine apparatus, in particular, of the combustor thereof rapidly rises up to high temperature (see the exhaust gas temperature of FIG. 6). This problem occurs also in the case employing the starting method shown in FIG. 5.

Figure 7:
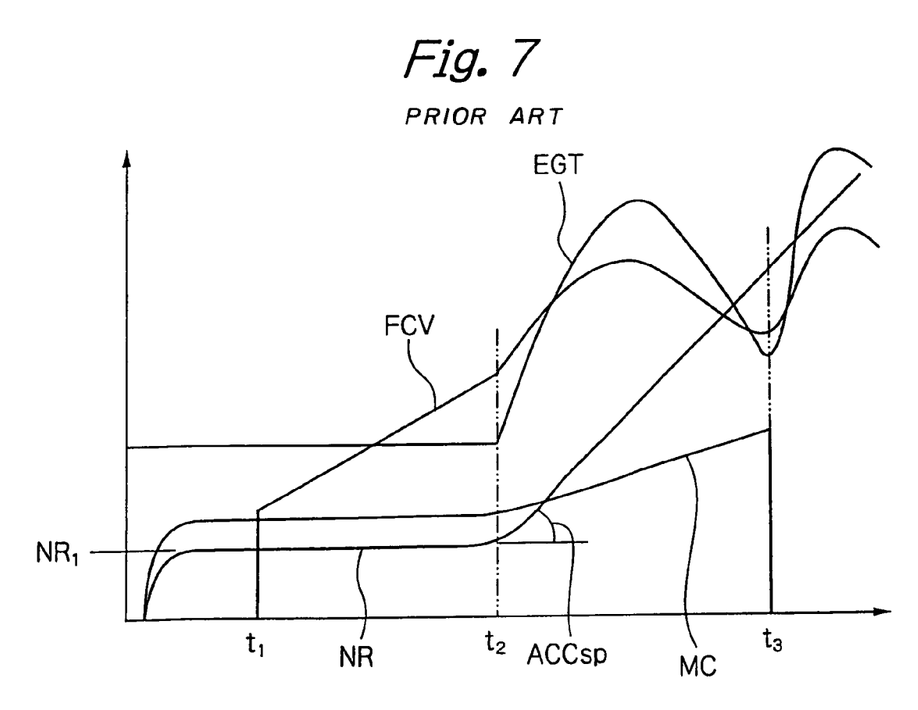
FIG. 7 is a diagram of a revolution speed of a turbine, a quantity of fuel supply per unit time, a temperature of an exhaust gas and a current supply per unit time to a motor of a still further conventional gas turbine apparatus during an igniting operation thereof, each illustrated as a function of an elapsed time.

FIG. 7 is a diagram of a revolution speed of the turbine, a temperature of an exhaust gas, a quantity of fuel supply per unit time, and a current supply per unit time to a motor of an another conventional gas turbine apparatus during an igniting operation, each illustrated as a function of an elapsed time. In FIG. 7, NR (Number of Revolution) represents a revolution speed of the turbine, FCV (Fuel Control Valve) represents an opening of the fuel flow control valve, EGT (Exhaust Gas Temperature) represents a temperature of the exhaust gas, and MC (Motor Current) represents a quantity of current supply per unit time to the motor, respectively.

In this conventional gas turbine apparatus, first of all, the turbine is rotatively driven by the motor, and as shown in FIG. 7, after the revolution speed of the turbine reaches up to a certain revolution speed NR1 allowing for ignition, this revolution speed is maintained. Then, the fuel flow control valve is opened to start a fuel supply ($t_1$) to the combustor, and the quantity of fuel supply per unit time is increased gradually. In synchronism with the starting of the fuel supply, the igniting operation on the mixture of fuel and air produced in the combustor is started, and when the air-fuel mixture is ignited ($t_2$), the mixture is burned to generate the combustion gas.

After the air-fuel mixture is ignited and the combustion gas is generated, the combustion gas is fed to the turbine and thereby the turbine is rotatively driven by the combustion gas and the motor. Subsequently, the current supply to the motor is stopped ($t_3$), and after that, the turbine is rotatively driven only by the combustion gas fed thereto. Further, after the air-fuel mixture is ignited and the combustion gas supply has been started ($t_2\sim$), a speed up control is applied in which the opening of the fuel flow control valve is controlled to increase the revolution of the turbine at a predetermined target acceleration (ACCsp).

However, in this conventional gas turbine apparatus, like the conventional apparatus shown in FIGS. 5 and 6, immediately after the speed up control has been applied ($t_2$), as shown in FIG. 7, the quantity of fuel supply per unit time is temporarily increased due to the speed up control to quickly raise the acceleration of revolution of the turbine from zero to the target acceleration (ACCsp) (see FCV in FIG. 7). Accordingly, the exhaust gas temperature also rises up rapidly, and thereby the temperature of the gas turbine apparatus, in particular of the combustor thereof rises up quickly up to high temperature which could result in a serious damage thereof (see EGT of FIG. 7).

On the other hand, after the rotative driving for the turbine by the motor has been stopped, the turbine is required to increase the revolution speed only by the combustion gas fed thereto. This might cause the additional problem that, right after the rotative driving by the motor has been stopped ($t_3$), the quantity of fuel supply per unit time is increased by a control action to maintain the target acceleration, which could result in a further temperature rise of the gas turbine apparatus.

SUMMARY OF THE INVENTION

The present invention has been made in the light of the problematic circumstances described above and the object thereof is to provide a gas turbine apparatus and a starting method thereof, which improves a reliability in starting operation by making it possible to ensure the ignition of the air-fuel mixture under various conditions, and further makes it possible to depress the temperature rise of the gas turbine, which may otherwise occurs immediately after the ignition.

Another object of the present invention is to provide a gas turbine apparatus which makes it possible to depress the rapid temperature rise of the gas turbine apparatus during the igniting operation by preventing a rapid increase of the quantity of fuel supply provided for the combustion.

In order to solve the problem described above, according to a first aspect of the present invention, there is provided an innovative starting method of a gas turbine apparatus comprising the steps of rotatively driving a turbine by a motor coupled to the turbine, while at the same time supplying a compressed air to a combustor by an air compressor operating in interlocking motion with the turbine, starting a fuel supply to the combustor when a revolution speed of the turbine has reached up to a predetermined value, and simultaneously starting an igniting operation on an air-fuel mixture in the combustor, the method characterized in that at least during the igniting operation to the air-fuel mixture in the combustor, a quantity of fuel supply per unit time to the combustor is increased while increasing the revolution speed of the turbine.

According to a second aspect of the present invention, there is provided an innovative gas turbine apparatus comprising a motor for rotatively driving a turbine, a motor control section for controlling a revolution speed of the motor, a combustor for burning an air-fuel mixture thereby generating a combustion gas therein, an air compressor for supplying a compressed air to said combustor, the compressor operating in interlocking motion with the turbine, and a fuel flow control valve for controlling a quantity of fuel supply per unit time to the combustor, the apparatus characterized in that at least during the igniting operation to the air-fuel mixture in the combustor, a quantity of fuel supply per unit time to the combustor is increased through the fuel flow control valve while increasing the revolution speed of the turbine by said motor control section by the use of the motor.

According to the first and second aspect of the present invention, since the air fuel ratio can be controlled to follow the change in the suitable ignition condition, it can be ensured to perform the igniting operation without any failure. Further, since the turbine has been accelerated to some extent when it is ignited, the deviation of the acceleration of revolution of the turbine at the point of ignition from the target acceleration thereof may be made small. Accordingly, an excessive supply of the fuel immediately after the ignition followed by the shifting to the speed up control phase can be avoided thereby preventing an excessive temperature rise in the gas turbine apparatus, which otherwise might occur right after the ignition.

According to a third aspect of the present invention, there is provided an innovative starting method of a gas turbine apparatus comprising the steps of igniting a mixture of fuel and air while rotatively driving a turbine by a motor, to combust the mixture, and supplying a combustion gas generated by the combustion to the turbine thereby increasing a revolution speed of the turbine, the method characterized in that for a predetermined time period after the mixture has been ignited, a quantity of fuel supply per unit time provided for the combustion is held to be constant.

According to the third aspect of the present invention, since the quantity of fuel supply per unit time is held constant for a certain time period after the air-fuel mixture is ignited, an excessive fuel supply can be prevented, which otherwise might occur immediately after the ignition. Consequently, the rapid temperature rise of the gas turbine apparatus could be prevented.

Further, according to a preferred embodiment of the third aspect, after the predetermined time period has elapsed, the quantity of fuel supply per unit time is gradually increased while at the same time, the rotative driving force for the turbine provided by the motor is decreased gradually.

According to the third aspect of the present invention, after a rotative driving mode of the turbine is gradually shifted from a driving phase by the motor to a driving phase by the combustion gas, the rotative driving of the turbine by the motor is stopped. As a result, since upon stopping the rotative driving by the motor, a control action for supplying the additional fuel to maintain the target acceleration can be relaxed, an excessive fuel supply may be depressed thereby preventing the rapid temperature rise of the gas turbine apparatus.

Further, if the revolution speed of the turbine increases while holding the quantity of fuel supply per unit time to be constant after the ignition, only the quantity of the air supplied into the combustor increases, which results in a drop of the ratio of the fuel to the air in the mixture produced in the combustor. This could cause sometimes a specific phenomenon referred to as a flame-out where a combustion flame goes out. According to the preferred embodiment of the third aspect, since the quantity of fuel supply per unit time is once held constant and then increased gradually, the rapid temperature rise of the gas turbine apparatus can be avoided while preventing the flame-out phenomenon from occurring.

According to a fourth aspect of the present invention, there is provided an innovative gas turbine apparatus in which a mixture of air and fuel is combusted and a combustion gas generated by the combustion is supplied to a turbine to rotatively drive the turbine, the apparatus characterized in comprising an ignition means for performing an igniting operation on the air-fuel mixture while rotatively driving the turbine by a motor during starting operation, a fuel flow control valve of variable opening for controlling a quantity of fuel supply to be provided for the combustion, an ignition detecting means for detecting an ignition of the air-fuel mixture; and an opening holding means for holding the opening of the fuel flow control valve to be constant for a predetermined time period after the ignition of the air-fuel mixture has been detected by the ignition detecting means.

According to a preferred embodiment of the fourth aspect, the innovative gas turbine apparatus further comprises a driving force controlling means for gradually decreasing a current supply per unit time to the motor and at the same time gradually increasing the opening of the fuel flow control valve after the predetermined time period has elapsed.

In this case, it is preferable that the driving force controlling means comprises an air fuel ratio control section for controlling an air fuel ratio of a mixture by operating the opening of the fuel flow control valve, and a current supply control section for controlling the current supply per unit time to the motor, wherein after the predetermined time period has elapsed, the opening of said fuel flow control valve is gradually increased by the air fuel ratio control section while controlling the motor by the current supply control section such that the turbine may keep a predetermined target acceleration of revolution.

Alternatively, it is also preferable that the driving force controlling means comprises a current supply control section for controlling the current supply per unit time to the motor, and an acceleration control section for controlling an acceleration of revolution of the turbine by operating the opening of the fuel flow control valve, wherein after the predetermined time period has elapsed, the current supply per unit time to the motor is gradually decreased by the current supply control section while controlling the turbine to keep the predetermined target acceleration of revolution by the acceleration control section.

The above and other objects, features and advantages of the present invention will become more apparent from the following description when taken in conjunction with the accompanying drawings in which preferred embodiments of the present invention are shown by way of illustrative examples.

DESCRIPTION OF THE PREFERRED EMBODIMENTS OF THE INVENTION

Preferred embodiments of the present invention will now be described with reference to the attached drawings.

Figure 1:
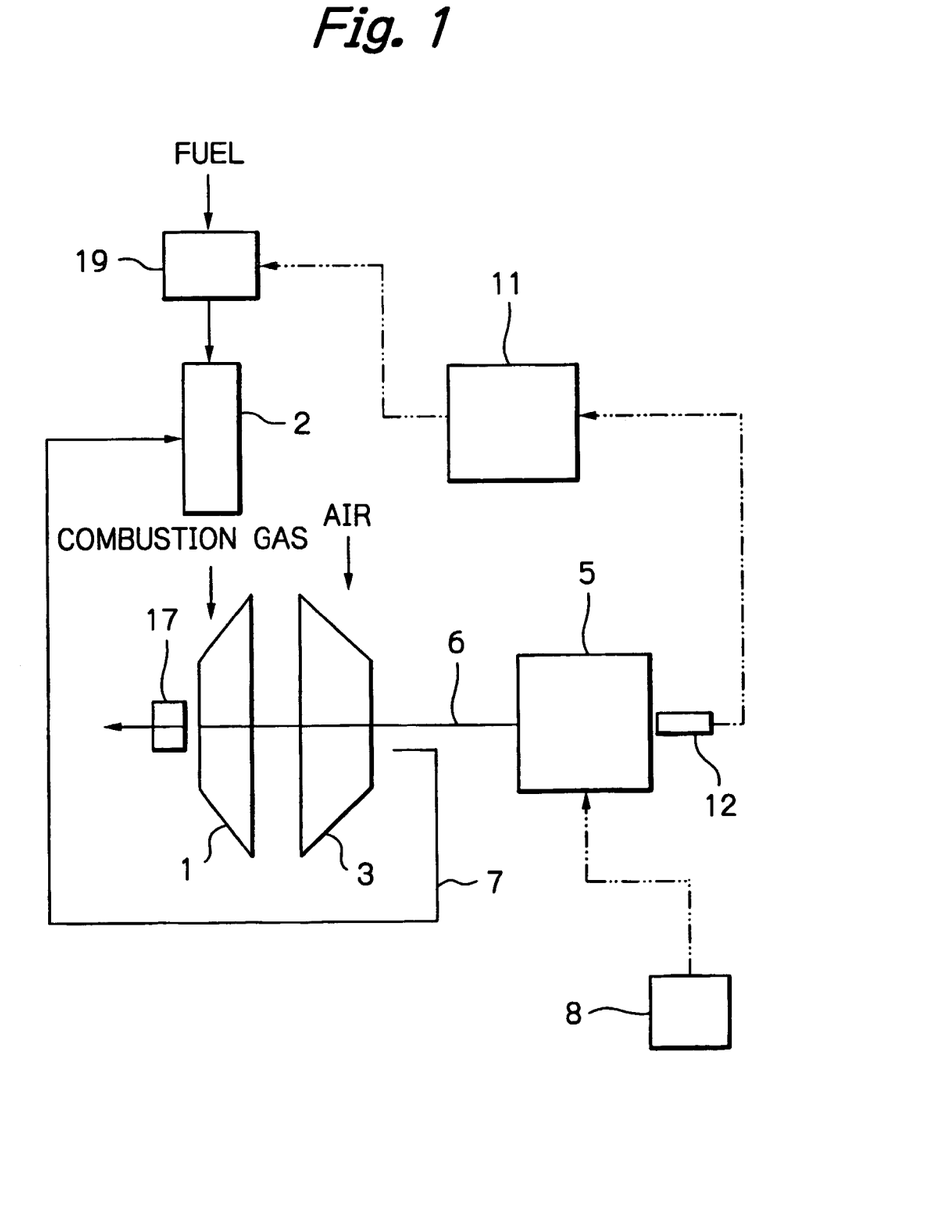
FIG. 1 is a schematic diagram illustrating a general configuration of a gas turbine apparatus according to an embodiment of the present invention.

FIG. 1 is a schematic diagram illustrating a general configuration of a gas turbine apparatus according to an embodiment of the present invention.

As shown in FIG. 1, the gas turbine apparatus according to the embodiment of the present invention comprises a turbine 1, a combustor 2 for supplying a combustion gas to the turbine 1, a fuel flow control valve 19 for controlling a quantity of fuel supply per unit time to the combustor 2, an air compressor 3 for supplying a compressed air to the combustor 2, and a turbine control section 11 for controlling the turbine 1.

The turbine 1 is equipped with a plurality of rotary vanes (not shown) for receiving a fluid for rotation, and rotatably supported via a rotary shaft 6 in a casing (not shown). The air compressor 3 is driven by the turbine 1 via the rotary shaft 6 so as to compress the air. The air compressor 3 is connected to the combustor 2 via a piping 7, so that the air compressed by the air compressor 3 is supplied to the combustor 2 through the piping 7.

The fuel flow control valve 19 is disposed upstream to the combustor 2, and the fuel supplied from a fuel supply source, though not shown, passes through the fuel flow control valve 19 and then enters the combustor 2. The fuel flow control valve 19 is configured to be of a variable opening type, such that the quantity of fuel supply to the combustor 2 may be controlled by operating the opening thereof. It is to be noted that the turbine control section 11 controls the turbine 1 by operating the opening of the fuel flow control valve 19 so that an acceleration of revolution of the turbine 1 may approach to a target acceleration.

The fuel and the compressed air supplied to the combustor 2 together produce an air-fuel mixture in the combustor 2, where the air-fuel mixture is burned to generate a combustion gas of high temperature and high pressure. Then, the combustion gas is supplied to the gas turbine 1 to revolve it at high revolution speed. A revolution speed detecting section 12 for detecting a revolution speed of the turbine 1 is installed on the rotary shaft 6 at a position near to a terminal end thereof located in the motor 5 side.

The gas turbine apparatus according to this embodiment further comprises the motor 5 coupled to the rotary shaft 6 and a motor control section 8 for controlling a revolution speed of the motor 5, as shown in FIG. 1. In this embodiment, the motor 5 functions as a starting motor for the gas turbine apparatus, wherein the motor control section 8 controls the revolution speed of the motor 5.

Figure 2:
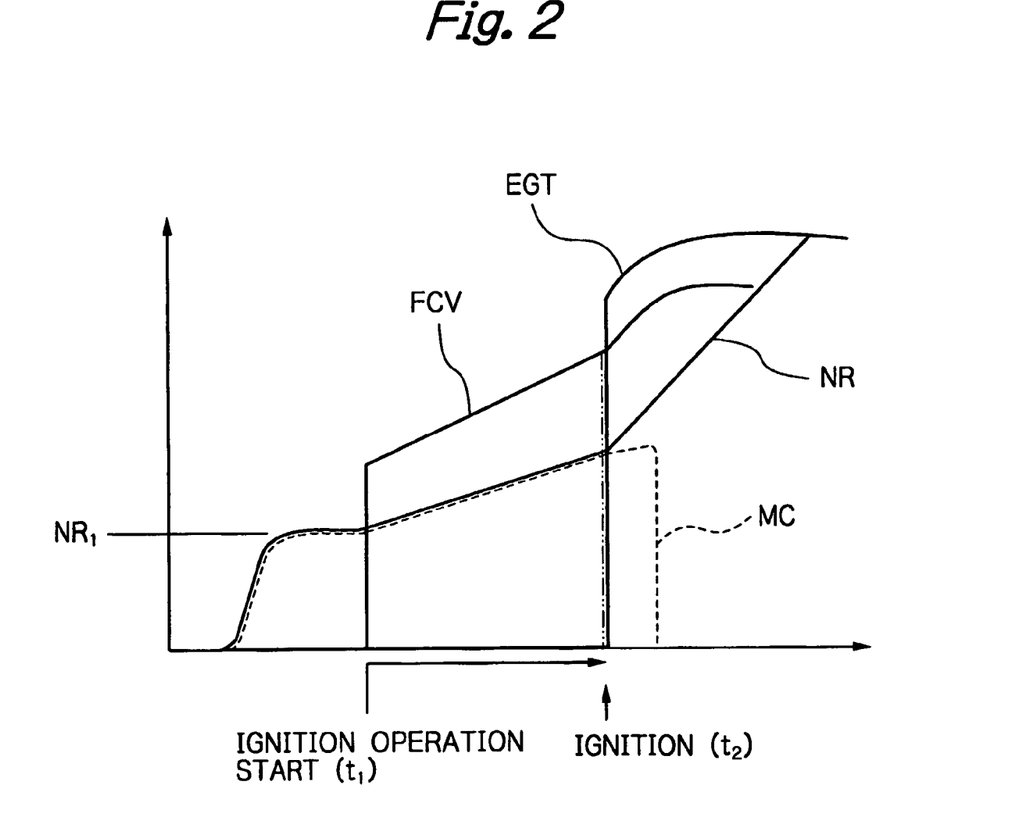
FIG. 2 is a diagram of a revolution speed of a turbine, an opening of a fuel flow control valve, and a temperature of an exhaust gas of a gas turbine apparatus during an igniting operation, each illustrated as a function of an elapsed time, according to an embodiment of the present invention.

FIG. 2 is a diagram of the revolution speed of the turbine(NR), the opening of the fuel flow control valve (FCV), and a temperature of an exhaust gas(EGT) of the gas turbine apparatus of the present embodiment during the igniting operation, each illustrated as a function of an elapsed time.

As shown in FIG. 2, when the gas turbine apparatus is to be started, first of all, an electric power is supplied to the motor 5 so that the turbine 1 may be rotatively driven by the motor 5 (see the dotted line MC in FIG. 2). After the revolution speed of the turbine 1 has reached up to a certain revolution speed suitable for ignition ($NR_i$), the motor 5 is controlled by the motor control section 8 such that the revolution speed of the turbine 1 may be increased gradually. At that time, since the motor 5 and the air compressor 3 are interlocked with each other through the rotary shaft 6, the quantity of the compressed air supply to the combustor 2 is also increased gradually.

Almost in synchronism with the starting of increase in the revolution speed of the turbine 1 by the motor control section 8, the fuel flow control valve 19 is opened to start a fuel supply to the combustor 2 ($t_1$). Further, upon starting the fuel supply to the combustor 2, the fuel flow control valve 19 is controlled to increase its opening gradually to increase the quantity of the fuel supply to the combustor 2.

In the combustor 2, the mixture is produced by the compressed air and the fuel, and the igniting operation on this air-fuel mixture is started almost in synchronism with the starting of the fuel supply to the combustor 2. Although the air fuel ratio of the mixture suitable for the ignition varies depending on conditions such as the temperature of the gas turbine main body, while during the igniting operation being performed (between $t_1$ and $t_2$), the actual air fuel ratio will vary since the quantities of the compressed air supply and the fuel supply to the combustor 2 both increase as described above. Accordingly, the air-fuel mixture is ignited when the air fuel ratio reaches a certain value matching the condition suitable for the ignition at that time.

After the igniting operation on the air-fuel mixture completed, the combustion gas is supplied to the turbine 1, which obtains a driving force from the combustion gas to increase its revolution speed. After the rotative driving of the turbine 1 by the combustion gas started (after $t_2$), the control mode is shifted to the speed up control phase by the turbine control section 11. It is to be noted that whether or not the igniting operation on the air-fuel mixture in the combustor 2 having been completed is determined by measuring the exhaust gas temperature with an exhaust gas temperature measuring device 17 installed on the piping.

Immediately after the control mode has been shifted to the speed up control phase, since the turbine 1 has been accelerated by the motor 5 to some extent as shown in FIG. 2, the deviation of the acceleration of revolution of the turbine 1 from the target acceleration thereof is small at this point. Accordingly, as shown in FIG. 2, the fuel flow control valve 19 is not required to open its opening excessively to bring the acceleration of revolution of the turbine 1 close to the target acceleration, and as a result, an excessive fuel supply to the combustor 2 can be avoided thereby preventing an excessive temperature rise in the gas turbine apparatus, which otherwise might occur right after the ignition.

Figure 3:
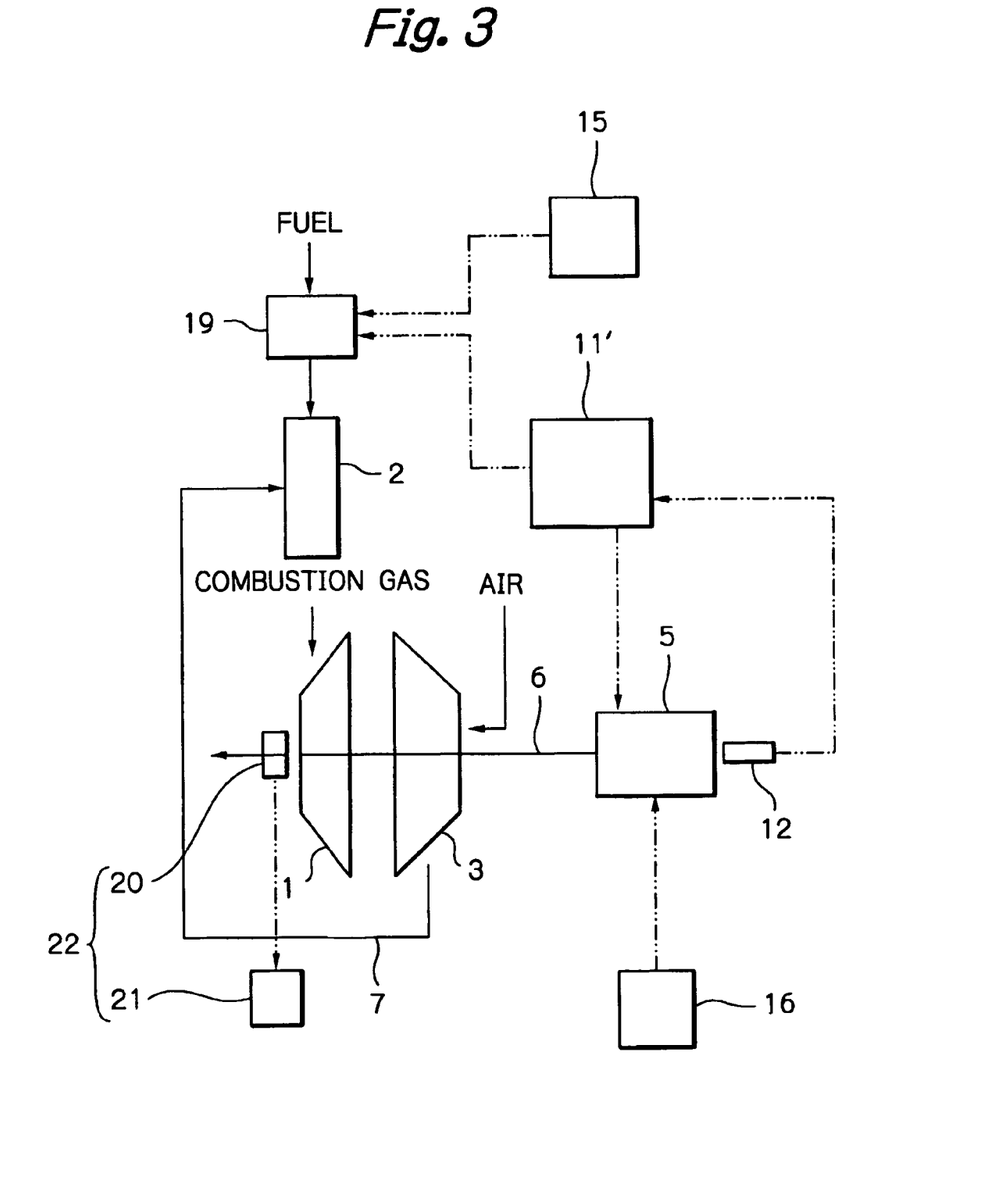
FIG. 3 is a schematic diagram illustrating a general configuration of a gas turbine apparatus according to an another embodiment of the present invention.

FIG. 3 is a schematic diagram illustrating a general configuration of the gas turbine apparatus according to a second embodiment of the present invention.

As shown in FIG. 3, the gas turbine apparatus according to this embodiment essentially comprises a turbine 1, a combustor 2 for combusting a mixture of fuel and air, a fuel flow control valve 19 for controlling a quantity of fuel supply to the combustor 2, and an air compressor 3 which operates in interlocking motion with the turbine 1 for supplying a compressed air to the combustor 2, like the aforementioned embodiment.

The turbine 1 is equipped with a plurality of rotary vanes (not shown) for receiving a fluid for rotation, and rotatably supported via a rotary shaft 6 in a casing(not shown). The air compressor 3 is driven by the turbine 1 via the rotary shaft 6 so as to compress the air. The air compressor 3 is connected to the combustor 2 via a piping 7, so that the air compressed by the air compressor 3 is supplied to the combustor 2 through the piping 7.

The fuel flow control valve 19 is disposed upstream to the combustor 2, and the fuel supplied from a fuel supply source, though not shown, passes through the fuel flow control valve 19 and enters the combustor 2. The fuel flow control valve 19 is configured to be of a variable opening type, such that the quantity of fuel supply to the combustor 2 may be controlled by operating the opening thereof.

The fuel and the air supplied to the combustor 2 together produce an air-fuel mixture in the combustor 2, where the air-fuel mixture is burned to generate a combustion gas of high temperature and high pressure. Then, the combustion gas is supplied to the gas turbine 1 to revolve it at high revolution speed. A revolution speed of the turbine 1 is detected by a revolution speed detecting section 12 installed on the rotary shaft 6 at a location near to a terminal end thereof, and the revolution speed of the turbine 1 detected by the revolution speed detecting section 12 is sent to an acceleration control section 11'.

The acceleration control section 11' calculates an acceleration of revolution of the turbine 1 by differentiating the revolution speed of the turbine 1 sent from the revolution speed detecting section 12, and controls the acceleration of revolution of the turbine 1 by operating the opening of the fuel flow control valve 19 so that the calculated acceleration may approach a target acceleration.

A generator 5 is coupled with the rotary shaft 6 at a location near to the terminal end thereof, through which the generator 5 is rotatively driven by the turbine 1 to generate electricity. It is to be noted that in this embodiment, the generator 5 is used as a starting motor during the starting operation. Accordingly, the generator will be sometimes referred to as a motor in the following description.

The gas turbine apparatus according to this embodiment further comprises an ignition means for performing an igniting operation on the air-fuel mixture while rotatively driving the turbine 1 by the motor 5 during the starting operation, an ignition detecting means 22 for detecting the ignition of the air-fuel mixture, an air fuel ratio control section 15 for controlling a ratio between air and fuel in the air-fuel mixture by operating the opening of the fuel flow control valve 19, a current supply control section 16 for controlling a current supply per unit time to the motor 5.

In the present embodiment, the ignition means designates an ignition plug (not shown) installed within the combustor 2. Further, the ignition detecting means 22 of the present embodiment comprises an exhaust gas temperature sensor 20 for measuring a temperature of the combustion gas after having been supplied to the turbine 1, and an ignition determining section 21 for determining the ignition of the mixture when the exhaust gas temperature measured by the exhaust gas temperature sensor 20 indicates a predetermined rising rate.

The air fuel ratio control section 15 is designed to hold the opening of the fuel flow control valve 19 to be constant for a predetermined time period after the detection of the ignition of the air-fuel mixture by the ignition detecting means 22. That is, the air fuel ratio control section 15 functions as a means for holding the opening (hereafter referred to as an opening holding means). Further, the air fuel ratio control section 15 is designed to gradually increase the opening of the fuel flow control valve 19 after the above predetermined time period has elapsed.

The current supply control section 16 makes it possible for the turbine 1 to be controlled to a desired revolution speed and/or acceleration during the starting operation by controlling the current supply per unit time to the motor 5. The current supply control section 16 is designed such that the turbine 1 may be held at a predetermined revolution speed suitable for the ignition during the ignition means performing the igniting operation on the air-fuel mixture, and further designed such that the revolution of the turbine 1 may be increased at a predetermined target acceleration while the quantity of fuel supply per unit time is held constant by the air fuel ratio control section 15 after the ignition of the air-fuel mixture.

According to the air fuel ratio control section 15 and the current supply control section 16 configured as described above, after the quantity of fuel supply per unit time has been held constant for the predetermined time period following the ignition of the air-fuel mixture, since the quantity of fuel supply per unit time is gradually increased by the air fuel ratio control section 15, then a rotative driving force of the turbine 1 by the combustion gas is increased. At that time, since the current supply control section 16 controls the current supply per unit time to the motor 5 such that the revolution of the turbine 1 may increase at a target acceleration, the current supply per unit time to the motor 5 is decreased in synchronism with the increase of the rotative driving force provided by the combustion gas.

That is, when the acceleration of revolution of the turbine 1 is held constant via the motor 5, if the rotative driving force for the turbine 1 provided by the combustion gas increases, in synchronism therewith, the rotative driving force for the turbine 1 provided by the motor 5 decreases. Accordingly, in the present embodiment, the driving force control means is composed of the air fuel ratio control means 15 and the current supply control section 16.

Figure 4:
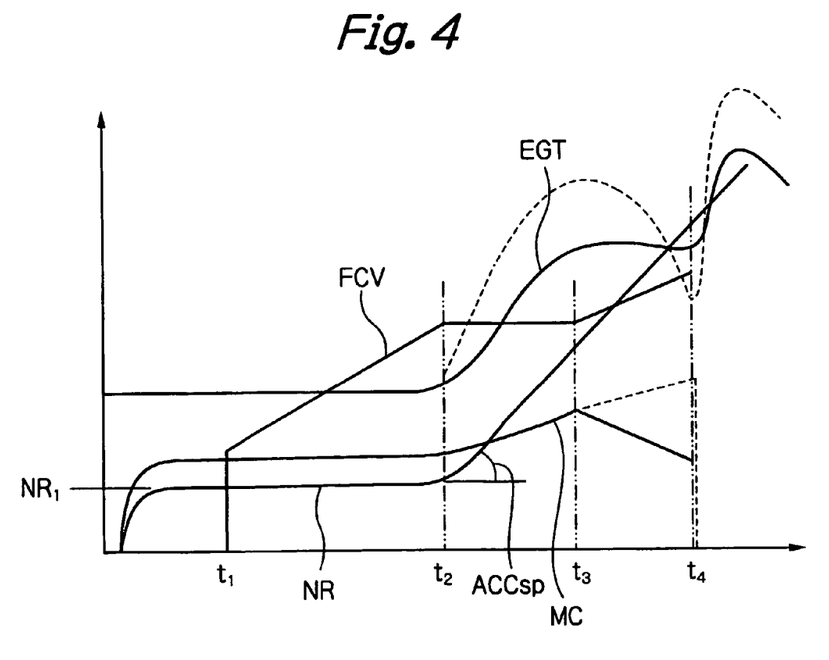
FIG. 4 is a diagram of a revolution speed of a turbine, a quantity of fuel supply per unit time, a temperature of an exhaust gas and a current supply per unit time to a motor of a gas turbine apparatus during an igniting operation, each illustrated as a function of an elapsed time, according to the another embodiment of the present invention.

An operation of the opening holding means and the driving force control means will now be described with reference to FIG. 4. FIG. 4 is a diagram of the revolution speed of the turbine, the quantity of fuel supply per unit time, the exhaust gas temperature and the current supply per unit time to the motor of the gas turbine apparatus of the embodiment shown in FIG. 3 during the igniting operation, each illustrated as a function of the elapsed time. In FIG. 4, NR represents the revolution speed of the turbine 1, FCV the opening of the fuel flow control valve 19, EGT the exhaust gas temperature, and MC the current supply per unit time to the motor 5, respectively. As comparison, those for the conventional gas turbine apparatus shown in FIG.7 are shown by dotted lines.

As shown in FIG. 4, first of all, the turbine 1 is rotatively driven by the motor 5, and when the revolution speed of the turbine 1 reaches up to a certain value NR1 suitable for the ignition, this revolution speed is maintained under a control of the current supply control section 16. Then the fuel flow control valve 19 is opened to start a fuel supply ($t_1$), and the fuel is supplied to the combustor 2 while gradually increasing a quantity of fuel supply per unit time. In synchronism with starting of the fuel supply, the igniting operation is started by the ignition means in the combustor 2.

When the air-fuel mixture is ignited ($t_2$), the air-fuel mixture is combusted to generate the combustion gas, and consequently the revolution speed of the turbine 1 is increased since in addition to the motor, the combustion gas also provides a driving force to the turbine 1. When the air-fuel mixture is ignited, the exhaust gas temperature rises, and so the completion of the igniting operation to the air-fuel mixture is detected by the ignition detecting means 22.

When the ignition of the air-fuel mixture is detected by the ignition detecting means 22, for a predetermined time period starting from this detection time (from $t_2$ to $t_3$), the opening of the fuel flow control valve 19 is controlled to be constant by the air fuel ratio control section 15 and thereby the quantity of fuel supply per unit time to the combustor 2 is kept constant (see FCV in FIG. 4). In prior art shown in FIG. 7, however, the acceleration control section 11' applies a speed up control mode right after the ignition and thereby the exhaust gas temperature rises up rapidly as shown by a dotted line in FIG. 4, but in the present embodiment, the excessive temperature rise in the exhaust gas can be avoided since the quantity of fuel supply per unit time provided for the combustion by the air fuel ratio control section 15 is held constant.

After the ignition of the air-fuel mixture ha been detected by the ignition detecting section 22, the turbine 1 will receive the driving force from both of the combustion gas and the motor 5 to increase the revolution speed thereof. At that time, the current supply control section 16 controls the motor 5 such that the revolution of the turbine 1 may increase with the predetermined target acceleration (ACCsp). This allows the revolution of the turbine 1 to increase with the target acceleration (ACCsp) even while the opening of the fuel flow control valve is held constant.

After the opening of the fuel flow control valve 19 held constant for the predetermined time period, then the air fuel ratio control section 15 controls the fuel flow control valve 19 such that the opening thereof may increase gradually with a predetermined increasing rate ($t_3$~). Consequently, the rotative driving force for the turbine provided by the motor 5, or the current supply per unit time to the motor 5, is gradually decreased (see MC in FIG. 4) since the current supply control section 16 controls the revolution of the turbine 1 to be held at the predetermined acceleration, as described above. That is, as the rotative driving force by the combustion gas is increased by increasing the opening of the fuel flow control valve 19, the current supply per unit time to the motor 5 is automatically decreased to reduce the rotative driving force by the motor 5.

When the current supply per unit time to the motor 5 is decreased and the quantity of fuel supply per unit time provided for the combustion is increased to some extent, the current supply to the motor is stopped completely ($t_4$). Under this condition, the turbine 1 is required to increase its revolution speed only by the combustion gas supplied therefor. After the current supply to the motor 5 has dropped to zero, a main controller for the apparatus is switched from the air fuel ratio control section 15 to the acceleration control section 11', which applies thereafter the speed up control to the turbine 1.

In this embodiment, the excessive supply of the fuel to the combustor 2, which otherwise might occur immediately after the current supply to the motor 5 having been stopped completely, can be avoided by gradually shifting the driving mode of the turbine 1 from that by the motor 5 to that by the combustion gas before stopping the current supply to the motor 5. Further, if the quantity of fuel supply per unit time provided for the combustion is held constant while increasing the revolution of the turbine 1 after the ignition of the air-fuel mixture, the ratio of the fuel quantity to the air quantity in the mixture drops, which may sometimes lead to the flame out. In the present embodiment, however, since the quantity of fuel supply per unit time is once held constant after the ignition and then increased gradually, the rapid temperature rise of the gas turbine apparatus can be avoided while preventing the flame-out from occurring.

Next, a third embodiment of the present invention will be described.

General configuration of the gas turbine apparatus according to the third embodiment is completely similar to that of the second embodiment. Further, in the present embodiment, the behaviors of the revolution speed of the turbine, the quantity of fuel supply per unit time, the exhaust gas temperature and the current supply per unit time to the motor of the gas turbine apparatus observed during the starting operation are similar to those in the second embodiment. Therefore, the configuration and the action of the present embodiment accompanied with no specific descriptions therefor are similar to those of the second embodiment, and the description thereof will be omitted.

The third embodiment is similar to the second embodiment in the point that the air fuel ratio control section 15 is provided as the opening holding means for the fuel flow control valve 19. A difference of the present embodiment from the second embodiment is that the former has a different driving force controlling means for gradually decreasing a current supply per unit time to the motor 5 while increasing the quantity of fuel supply per unit time. That is, in the present embodiment, the driving force control means comprises the current supply control section 16 and the acceleration control section 11'.

In the third embodiment, after the quantity of fuel supply per unit time is held constant for a predetermined time period by the air fuel control section 15, the current supply per unit time to the motor 5 is gradually decreased by the current supply control section 16 while holding the revolution of the turbine to be at a predetermined target acceleration by the acceleration control section 11'. When the current supply per unit time is decreased by the current supply control section 16, the rotative driving force for the turbine 1 provided by the motor 5 is reduced. In response to this, the acceleration control section 11' controls the fuel flow control valve 19 to increase the opening thereof and thereby to increase the rotative driving force provided by the combustion gas in order to keep the target acceleration of revolution of the turbine 1.

That is, under the condition where the acceleration of revolution of the turbine 1 is held constant by the acceleration control section 11', if the current supply per unit time to the motor 5 is decreased, the quantity of fuel supply per unit time provided for the combustion is increased by the acceleration control section 11'. As a result, the current supply per unit time to the motor 5 and the opening of the fuel flow control valve 19 show the same behaviors with those of the second embodiment described above.

Thus, though the present embodiment is different from the second embodiment in the driving force controlling means, the behaviors of the quantity of fuel supply per unit time to the combustor 2 and the current supply per unit time to the motor 5 observed during the igniting operation are quite the same with those of the second embodiment. Therefore, the present embodiment, similar to the second embodiment, can depress the rapid temperature rise of the gas turbine apparatus while preventing the flame-out from occurring during the igniting operation.

It should be appreciated that the gas turbine apparatus of the present invention is not limited to those described in the above embodiments, but may be modified in various manners without departing from the spirit and the scope of the present invention.

As having been described above, according to the present invention, since the air fuel ratio can be controlled to follow the change in the suitable ignition condition, it can be ensured to perform the igniting operation without any failure. Further, in the first embodiment, since the turbine has been accelerated to some extent when it is ignited, the deviation of the acceleration of revolution of the turbine at the point of ignition from the target acceleration thereof is small. Accordingly, an excessive supply of the fuel immediately after the ignition can be avoided thereby preventing an excessive temperature rise in the gas turbine apparatus, which otherwise might occur right after the ignition.

Also, in the second embodiment, by holding the quantity of fuel supply per unit time constant for a certain period after the air-fuel mixture is ignited, the excessive fuel supply can be prevented, which otherwise might occur immediately after the ignition. Consequently, the rapid temperature rise of the gas turbine apparatus could be prevented.

Further, by stopping the rotative driving of the turbine by the motor after the rotative driving mode of the turbine is gradually shifted from the driving phase by the motor to the driving phase by the combustion gas, upon stopping the rotative driving by the motor, the control action for supplying the additional fuel to maintain the target acceleration can be relaxed. Accordingly, the excessive fuel supply may be depressed thereby preventing the rapid temperature rise of the gas turbine apparatus.

Still further, by once holding the quantity of fuel supply per unit time constant and then increasing it gradually, the rapid temperature rise of the gas turbine apparatus can be avoided while preventing the flame-out from occurring.

What is claimed is:

1. A starting method of a gas turbine apparatus comprising the steps of:
    rotating a turbine by a motor coupled to said turbine, while supplying a compressed air to a combustor by an air compressor;
    starting a fuel supply to said combustor when a rotation speed of said turbine has reached a predetermined value, thus producing an air-fuel mixture; and
    starting an igniting operation to ignite the air-fuel mixture in said combustor;
    wherein during the igniting operation prior to a time when the air-fuel mixture in said combustor begins to ignite, a quantity of fuel supplied to said combustor per unit time is increased while the revolution speed of said turbine is increased.

2. A gas turbine apparatus comprising:
    a motor for rotatively driving a turbine;
    a motor control section for controlling a revolution speed of said motor;
    a combustor for burning an air-fuel mixture thereby generating a combustion gas therein;
    an air compressor for supplying a compressed air to said combustor, said compressor operating in interlocking motion with said turbine; and
    a fuel flow control valve for controlling a quantity of fuel supply per unit time to said combustor;
    wherein at least during an igniting operation for the air-fuel mixture in said combustor, and prior to a time when the air-fuel mixture in said combustor begins to ignite, a quantity of fuel supply per unit time to said combustor is increased through said fuel flow control valve while increasing a revolution speed of said turbine by said motor through control of said motor control section.

3. A starting method of a gas turbine apparatus comprising the steps of:
    igniting a mixture of fuel and air while rotatively driving a turbine by a motor, to combust said mixture; and
    supplying a combustion gas generated by said combustion to said turbine thereby increasing a revolution speed of said turbine;
    wherein for a predetermined time period immediately after the mixture begins to ignite, a quantity of fuel supply per unit time provided for the combustion is held to be constant.

4. A starting method of a gas turbine apparatus in accordance with claim 3, in which after said predetermined time period has elapsed, the quantity of fuel supply per unit time is gradually increased while at the same time, a rotative driving force for said turbine provided by said motor is decreased gradually.

5. A gas turbine apparatus in which a mixture of air and fuel is combusted and a combustion gas generated by said combustion is supplied to a turbine to rotatively drive said turbine, said apparatus comprising:
    an ignition means for performing an igniting operation on the air-fuel mixture while rotatively driving said turbine by a motor during starting operation;
    a fuel flow control valve of variable opening for controlling a quantity of fuel supply per unit time to be provided for the combustion;
    an ignition detecting means for detecting an ignition of the air-fuel mixture; and
    an opening holding means for holding the opening of said fuel flow control valve to be constant for a predetermined time period immediately after the beginning of ignition of the air-fuel mixture has been detected by said ignition detecting means.

6. A gas turbine apparatus in accordance with claim 5, said apparatus further comprising a driving force controlling means for gradually decreasing a current supply per unit time to said motor and at the same time gradually increasing the opening of said fuel flow control valve after said predetermined time period has elapsed.

7. A gas turbine apparatus in accordance with claim 6, in which said driving force controlling means comprises:
    an air fuel ratio control section for controlling an air fuel ratio of a mixture by operating the opening of said fuel flow control valve; and
    a current supply control section for controlling the current supply per unit time to said motor;
    wherein after said predetermined time period has elapsed, the opening of said fuel flow control valve is gradually increased by said air fuel ratio control section while controlling said motor by said current supply control section such that said turbine may keep a predetermined target acceleration of revolution.

8. A gas turbine apparatus in accordance with claim 6, in which said driving force controlling means comprises:
    a current supply control section for controlling the current supply per unit time to said motor; and
    an acceleration control section for controlling an acceleration of revolution of said turbine by operating the opening of said fuel flow control valve;
    wherein after said predetermined time period has elapsed, the current supply per unit time to said motor is gradually decreased by said current supply control section while controlling said turbine to keep the predetermined target acceleration of revolution by said acceleration control section.

* * * * *